US007089270B2

(12) United States Patent
Ren et al.

(10) Patent No.: US 7,089,270 B2
(45) Date of Patent: Aug. 8, 2006

(54) PROCESSING SOFTWARE IMAGES FOR USE IN GENERATING DIFFERENCE FILES

(75) Inventors: Liwei Ren, Alviso, CA (US); Jinsheng Gu, Alviso, CA (US)

(73) Assignee: InnoPath Software, Sunnyvale, CA (US)

( * ) Notice: Subject to any disclaimer, the term of this patent is extended or adjusted under 35 U.S.C. 154(b) by 0 days.

(21) Appl. No.: 10/600,978

(22) Filed: Jun. 20, 2003

(65) Prior Publication Data

US 2004/0260734 A1    Dec. 23, 2004

(51) Int. Cl.
G06F 17/30    (2006.01)
(52) U.S. Cl. .................. 707/203; 707/101; 707/102
(58) Field of Classification Search ................ 707/200, 707/203, 102, 101, 201
See application file for complete search history.

(56) References Cited

U.S. PATENT DOCUMENTS

| 5,479,654 A | 12/1995 | Squibb |
| 5,574,906 A * | 11/1996 | Morris ........................ 707/1 |
| 5,742,905 A | 4/1998 | Pepe |
| 5,813,017 A * | 9/1998 | Morris ...................... 707/204 |
| 5,832,520 A | 11/1998 | Miller |
| 6,018,747 A * | 1/2000 | Burns et al. ............... 707/203 |
| 6,052,531 A | 4/2000 | Waldin et al. |
| 6,088,694 A | 7/2000 | Burns |
| 6,167,258 A | 12/2000 | Schmidt |
| 6,233,589 B1 * | 5/2001 | Balcha et al. .............. 707/203 |
| 6,269,456 B1 | 7/2001 | Hodges et al. |
| 6,327,671 B1 | 12/2001 | Menon |
| 6,349,311 B1 | 2/2002 | Sobel et al. |
| 6,374,250 B1 | 4/2002 | Ajtai |
| 6,401,239 B1 * | 6/2002 | Miron ........................ 707/203 |
| 6,470,329 B1 | 10/2002 | Livschitz |
| 6,526,574 B1 | 2/2003 | Jones |
| 6,535,894 B1 | 3/2003 | Schmidt et al. |
| 6,542,906 B1 * | 4/2003 | Korn .......................... 707/203 |
| 6,615,404 B1 | 9/2003 | Garfunkel et al. |
| 6,651,190 B1 | 11/2003 | Worley et al. |
| 6,671,703 B1 * | 12/2003 | Thompson et al. ......... 707/202 |
| 6,694,336 B1 | 2/2004 | Multer |
| 2001/0029178 A1 | 10/2001 | Criss et al. |
| 2001/0049263 A1 | 12/2001 | Zhang |
| 2002/0099726 A1 | 7/2002 | Crudele |

(Continued)

OTHER PUBLICATIONS

Tichy, Walter F., "The string-to-string correction problem with block moves", ACM Transaction on Computer Systems, vol. 2, No. 4, Nov. 1984, pp. 309-321.

(Continued)

Primary Examiner—Greta Robinson
(74) Attorney, Agent, or Firm—Courtney Staniford & Gregory LLP

(57) ABSTRACT

Systems and methods are provided for pre-processing original and new versions of files as part of difference file generation between the original and new file versions, for example byte-level file differencing. Software/executable changes between file versions include primary changes/logical changes, which are defined to be the source code changes, and secondary changes. The secondary changes generally result from the primary changes and are generated by the software compiler/linker utilities. The secondary changes include address changes, pointer target address changes, and changes in address offsets. The pre-processing systems and methods provided use approximation rules between file versions to remove/reduce the secondary changes and encode information relating to the removal of these changes in information of the corresponding difference file.

41 Claims, 12 Drawing Sheets

U.S. PATENT DOCUMENTS

| | | |
|---|---|---|
| 2002/0129107 A1 | 9/2002 | Loughran |
| 2003/0212712 A1 | 11/2003 | Gu |
| 2004/0062130 A1 | 4/2004 | Chiang |
| 2004/0092255 A1 | 5/2004 | Ji |
| 2004/0098361 A1 | 5/2004 | Peng |
| 2004/0098413 A1 | 5/2004 | Peng |
| 2004/0098420 A1 | 5/2004 | Peng |
| 2004/0098421 A1 | 5/2004 | Peng |
| 2004/0098427 A1 | 5/2004 | Peng |
| 2004/0111427 A1 | 6/2004 | Gu |

OTHER PUBLICATIONS

Ajtai, Miklos et al., "Compactly encoding unstructured inputs with differential compression", IBM Almaden Research Center, 44 pages.

Burns, Randal C. et al., "In-place reconstruction of delta compressed files", IBM Almaden Research Center, 9 pages.

Burns, Randal et al., "In-Place reconstruction of version differences", IBM Almaden Research Center, 25 pages.

* cited by examiner

PROCESSING SOFTWARE IMAGES FOR USE IN GENERATING DIFFERENCE FILES

RELATED APPLICATION

This application relates to U.S. Pat. No. 6,925,467 B2 filed May 13, 2002.

TECHNICAL FIELD

The disclosed embodiments relate to updating of electronic files using difference files.

BACKGROUND

Software running on a processor, microprocessor, and/or processing unit to provide certain functionality often changes over time. The changes can result from the need to correct bugs, or errors, in the software files, adapt to evolving technologies, or add new features, to name a few. In particular, embedded software components hosted on mobile processing devices, for example mobile wireless devices, often include numerous software bugs that require correction. Software includes one or more files in the form of human-readable American Standard Code for Information Interchange (ASCII) plain text files or binary code. Software files can be divided into smaller units that are often referred to as modules or components.

Portable processor-based devices like mobile processing devices typically include a real-time operating system (RTOS) in which all software components of the device are linked as a single large file. Further, no file system support is typically provided in these mobile wireless devices. In addition, the single large file needs to be preloaded, or embedded, into the device using a slow communication link like a radio, infrared, or serial link.

Obstacles to updating the large files of mobile processing devices via slow communication links include the time, bandwidth, and cost associated with delivering the updated file to the device. One existing solution to the problem of delivering large files to mobile processing devices includes the use of compression. While a number of existing compression algorithms are commonly used, often, however, even the compressed file is too large for download to a device via a slow, costly, narrowband communication link.

Another typical solution for updating files uses difference programs to generate a description of how a revised file differs from an original file. There are available difference programs that produce such difference data. However, as with compression, the difference files produced using these difference programs can sometimes be too large for transfer via the associated communication protocols.

Figure 1:
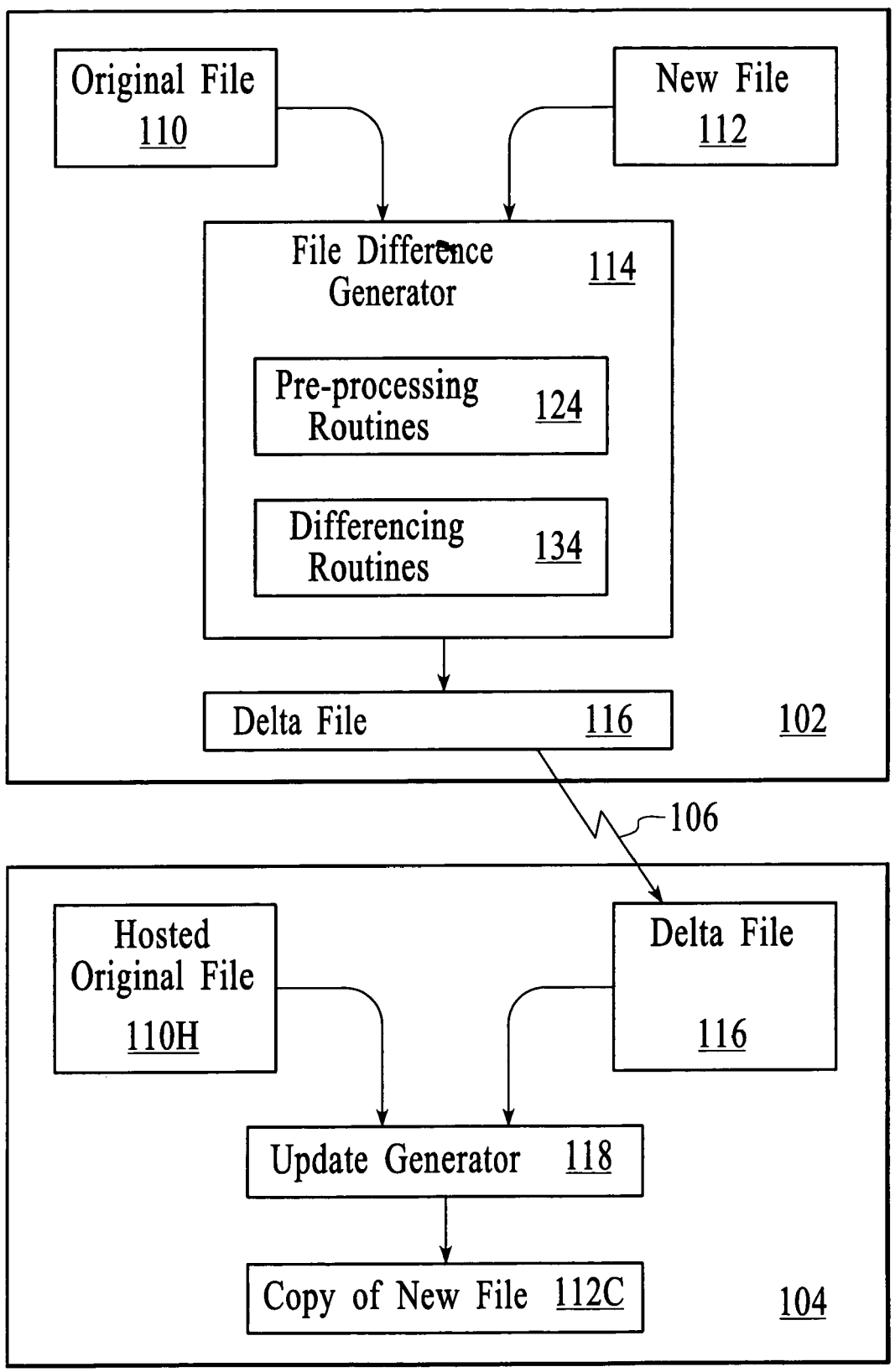
FIG. 1 is a block diagram showing file differencing and updating, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 124 is first introduced and discussed with respect to FIG. 1).

DETAILED DESCRIPTION

Systems and methods are provided for pre-processing original and new versions of files as part of difference file generation between the original and new file versions. This pre-processing supports a further reduction in the size of the difference file. Software/executable changes between file versions include primary changes/logical changes, which are defined to be the source code changes, and secondary changes. The secondary changes generally result from the primary changes and are generated by the software compiler/linker utilities. The secondary changes include address changes, pointer target address changes, and changes in address offsets resulting from the primary changes and generated by the software compiler/linker utilities. The pre-processing systems and methods provided use approximation rules between file versions to remove/reduce the secondary changes and encode information relating to the removal of these changes in information of the corresponding difference file.

Systems and methods for generating difference files between two versions of an electronic file, herein referred to as file differencing, are described in detail herein. FIG. 1 is a block diagram showing file differencing and updating provided under an embodiment. The file differencing and updating includes a differencing component and an updating component. The differencing component, referred to herein as the file difference generator, generates a difference file in a first processor-based or computer system from an original version and a new version of an electronic file. The updating component, referred to herein as the update generator, generates a copy of the new file on a second processor-based or computer system using the difference file and the hosted copy of the original file.

In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

With reference to FIG. 1, a first computer system 102 and a second computer system 104 communicate via a communication path 106. These computer systems 102 and 104 include any collection of computing components and devices operating together, as is known in the art. The computer systems 102 and 104 can also be components or subsystems within a larger computer system or network.

The communication path 106 includes any medium by which files are communicated or transferred between the computer systems 102 and 104. Therefore, this path 106 includes wireless connections, wired connections, and hybrid wireless/wired connections. The communication path 106 also includes couplings or connections to networks including local area networks (LANs), metropolitan area networks (MANs), wide area networks (WANs), proprietary networks, interoffice or backend networks, and the Internet. Furthermore, the communication path 106 includes removable fixed mediums like floppy disks, hard disk drives, and CD-ROM disks, as well as telephone lines, buses, and electronic mail messages.

The first communication system 102 receives an original, or old, version 110 and a new version 112 of an electronic file. The new file 112 is generally an updated or revised version of the original file 110, but is not so limited. The electronic files 110 and 112 include software files including dynamic link library files, shared object files, embedded software components (EBSCs), firmware files, executable files, data files including hex data files, system configuration files, and files including personal use data, but are not so limited. Since any type of file can be regarded as a byte stream, hereinafter a file can be described as a byte stream, depending on the context.

Components of the file difference generator 114 receive the new file 112, compare it to the original file 110, and calculate the differences between the compared files, as described below. These differences include byte-level differences between the compared files, but are not so limited. The file difference generator 114 generates a difference file 116, referred to herein as a delta file 116, during the comparison.

The file difference generator 114 of an embodiment couples among components of the host computer system 102, where the components include at least one of a processor, at least one controller, at least one memory device, and at least one bus, but is not so limited. The components of the file difference generator 114 of an embodiment include at least one pre-processing subsystem 124 and at least one differencing subsystem 134. The pre-processing subsystem 124, also referred to as the pre-processor 124, includes at least one processor running under control of at least one pre-processing algorithm, program, or routine. Likewise, the differencing subsystem 134 includes at least one processor running under control of at least one differencing algorithm, program, or routine.

Contents of the delta file 116 provide an efficient representation of the differences between the new files 112 and the original files 110. The delta file 116 includes meta-data along with actual data of replacement and/or insertion operations that represent the differences between the new or current version of the associated file and previous versions of the file, as described in the U.S. patent application entitled "Byte-Level File Differencing and Updating Algorithms," application Ser. No. 10/146,545, filed on May 13, 2002. The file difference generator 114 provides any differences between the original 110 and the new 112 files in the delta file 116 using a minimum number of bytes and a pre-defined format or protocol, thereby providing a delta file optimized in space.

The delta file 116 is transferred or transmitted to another processing system 104 via the communication path 106. Prior to transfer, the delta file 116 may be compressed using compression techniques known in the art, but is not so limited. The update generator 118 hosted on the receiving system 104 uses the delta file 116 along with the hosted original file 110H to generate or create a copy of the new file 112C. This copy of the new file 112C is then used to update the original file 110H hosted on the client device that is targeted for revision or updating. Upon completion of this update process, the new file now stored on the second computer system is identical to the new file 112 received in the first computer system 102.

The differences between an original file and a new file are typically smaller than the new file, leading to significant storage and transmission savings if the differences are transmitted and stored instead of the entire new file. This is particularly important for mobile electronic devices (client devices) hosting programs that are updated via connections that typically can be slow and expensive, for example wireless or cellular connections. The reduced size of the delta file provides numerous improvements, one of which includes a reduction in bandwidth required for transmission of the delta file to the client device; the smaller file means less bandwidth is required for the transfer. Also, smaller files require less time for transmission and, therefore, decrease the probability that the file transfer will be interrupted and simultaneously reduce transmission errors in the received file. In addition, it is safer to transmit the delta files than the new software images via a non-secure connection. All of these improvements increase customer satisfaction.

Figure 2:
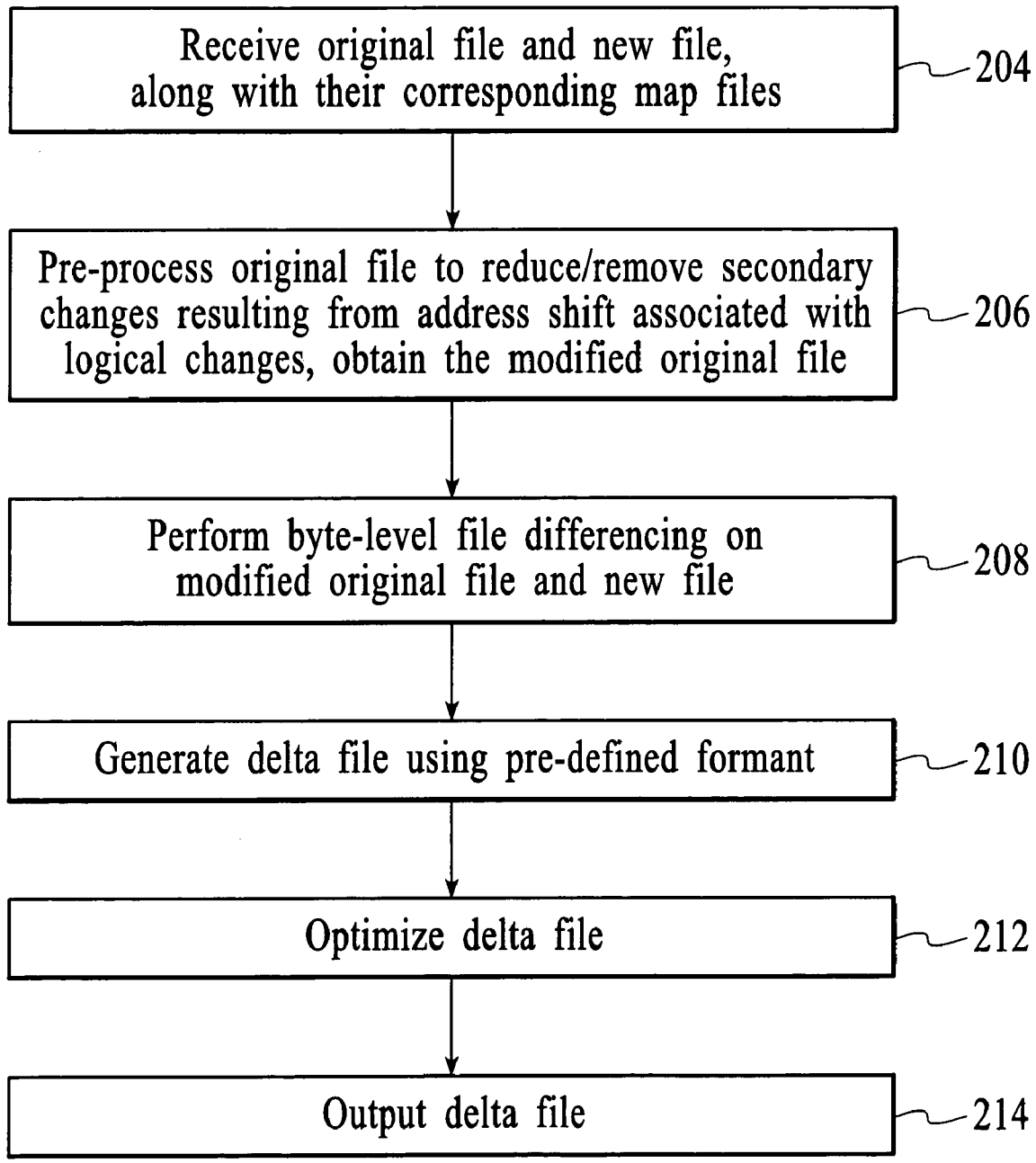
FIG. 2 is a flow diagram for generation of a delta file, under the embodiment of FIG. 1.

FIG. 2 is a flow diagram for generation of a delta file, under the embodiment of FIG. 1. Operation begins when a new file and an original file are received in a first processing or computer system, at block 204. The map files corresponding to the new and original files are also received. The map file is a high-level text file that includes the start address and size of each symbol of a software image, with symbol examples including function and global variables. The map file is output by compiler/linker utilities, and is also known as a log file, symbol file, and/or list file.

Pre-processing operations are performed between contents of the new file and the original file in order to identify common segments and simple patterns among contents of the two files, at block 206. Generally, the pre-processing uses identified common segments and patterns to reduce/remove the secondary changes between the new and original files. The pre-processing of an embodiment includes reducing and/or removing changes between the original and new files resulting from address shifts associated with logical changes, as described below, but is not so limited. Thus, this pre-processing reduces the differences among common segments of the files, including secondary changes, thereby increasing the efficiency of the difference calculation.

Following pre-processing, the byte-level differences are calculated between the new file and the modified original file, at block 208. The calculated differences are coded and merged, and the delta file is generated by following the pre-defined encoding format, at block 210. The delta file is then optimized as is known in the art to further reduce the file size, when possible, at block 212, and the optimized delta file is provided as an output, at block 214.

As described above, pre-processing operations are performed between the contents of the new file and the original file in order to identify common segments and simple patterns among contents of the two files. The knowledge of common segments and simple patterns is used to reduce/remove the secondary changes, thereby resulting in an overall performance gain.

As described above, the transmission of electronic file or software upgrades between a system and a client device can take a significant amount of time, especially when done via low bandwidth channels. An example is a cellular telephone software upgrade. It has become typical practice to send the byte-level file differences or changes between the new and original software versions over the cellular wireless couplings. The significant transfer time arises because the differences between the new and original versions of the executable files are more complex than the differences between their corresponding source files.

These complex differences between the new and original file versions arise in part because a small change in the source files often introduces major changes throughout the executable files. As an example, the changes introduced in the executable files include two main types of changes: primary changes and secondary changes. The primary changes, also referred to as logical changes, are source code changes arising from source code line deletion from the original file, source code line addition to the new file, and source code line modifications. The secondary changes are defined to include, but not limited to, address changes, pointer target address changes, and changes in address offsets resulting from the primary changes and generated by the software compiler/linker utilities. The pre-processing routines described below remove/reduce the secondary changes and encode information relating to the removal of these changes in information of the corresponding delta file.

Figure 3:
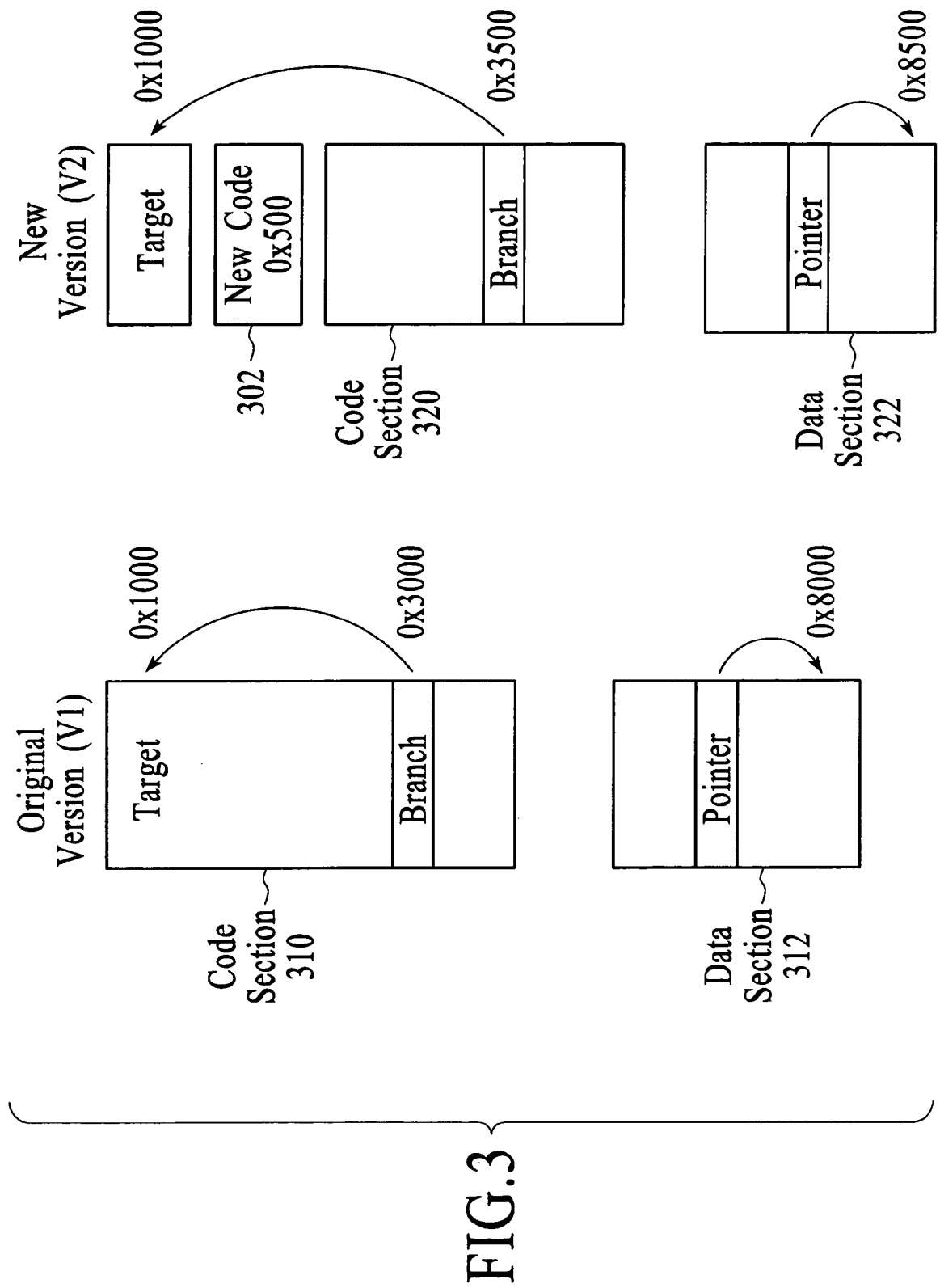
FIG. 3 is a block diagram showing an original and a new version of an executable file.

An analysis of the secondary changes introduced in the executable files begins with an assumption that the executable files include code (text) sections and data sections. FIG. 3 is a block diagram 300 showing an original V1 and a new V2 version of an executable file. The original V1 and new V2 versions both include a code (text) section 310 and 320 and a data section 312 and 322. The new version V2 differs from the original V1 in that the new version V2 includes an additional block of new code 302 of size 0x500. The presence of the block of new code 302 introduces two types of secondary changes.

A first type of secondary change occurs in the code (text) section 320 of the new version V2 and results in the branch instruction BRANCH having a different branch displacement, also referred to as the relative address or branch offset, resulting from the addition of the block of new code 302 between the address of the branch instruction BRANCH and the target instruction address TARGET. In this example, the target instruction address is 0x1000, and the branch instruction address is 0x3000, resulting in a branch displacement of 0x2000 (0x3000−0x1000) in the original version. The addition of the block of new code (size 0x500) between the branch instruction address and the target instruction address changes the branch instruction address to 0x3500 (0x3000+0x500). Therefore, the branch displacement in the new version V2 changes to 0x2500 (0x3500−0x1000).

A second type of secondary change occurs in the data section 322 of the new version V2 and results in a change of the value stored in the data pointer POINTER, or the data pointer value, which stores the absolute address of a corresponding data area. The change of the data pointer value results from the addition of the new code 302 in the code (text) section. The new code 302 is inserted at a point in the original version that precedes the data section 322. Thus, the data pointer value, which is 0x8000 in the original version, changes to 0x8500 (0x8000+0x500) in the new version.

As the software development becomes increasingly complicated, the secondary changes spread throughout the executable files to the point that the secondary changes can outnumber the primary changes when considered in the context of byte-level file differencing. The pre-processing routines described below use relationships between the original and new versions of files to reduce the amount of information encoded in the delta file as to differences relating to the secondary changes. With the minimum information, the effect of cascading computations can be achieved when doing byte-level differencing and reconstructing, thereby reducing the size of the delta file.

Generally, the pre-processing routine of an embodiment includes at least one approximation routine and at least one merging routine for use in minimizing the delta file size. The approximation routines function to reduce/remove secondary changes according to text (code) and data model assumptions. The merging routines, also referred to as a hint merging routines, encode the model information at a least-cost level for transfer to devices receiving the new versions. The model information is used in the recovery of the new version in the device, as described above, but is not so limited.

Figure 4:
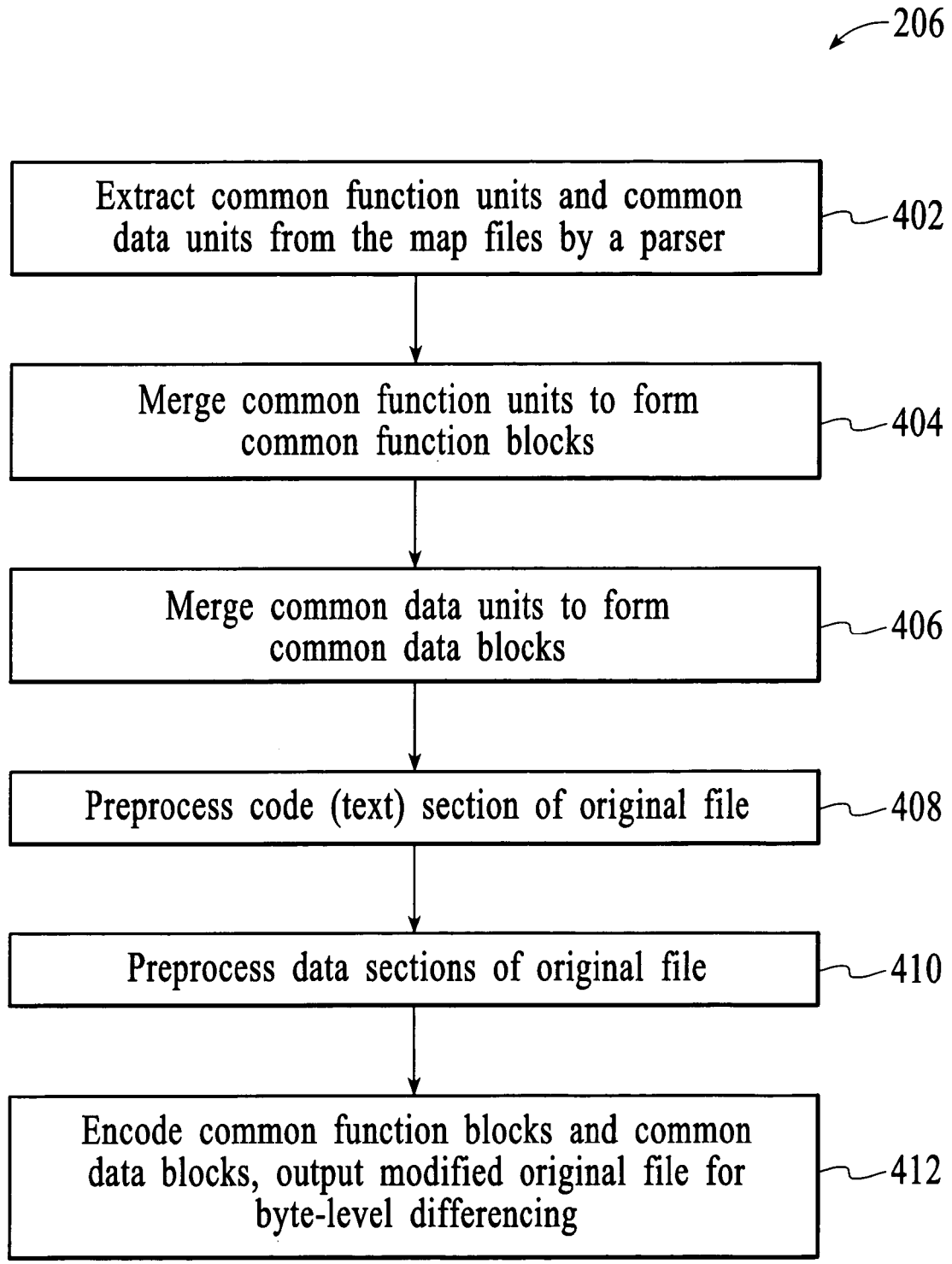
FIG. 4 is a flow diagram for pre-processing different versions of an electronic file, under the embodiment of FIG. 1 and FIG. 2.

FIG. 4 is a flow diagram 206 for pre-processing different versions of an electronic file, under the embodiment of FIG. 1 and FIG. 2. Upon receiving the new and original versions of a file, the common function units and common data units are extracted from the associated map files, at block 402. The common function units are merged to form common function blocks, at block 404, as described in detail below and with reference to FIG. 11. Likewise, the common data units are merged to form common data blocks, at block 406, as described in detail below and with reference to FIG. 12. Then, the pre-processing routines of a pre-processing system pre-process the code (text) sections of the new and original files, at block 408, as described below with reference to FIGS. 5, 6, and 7. The pre-processing routines subsequently or simultaneously pre-process the data sections of the new and original files, at block 410, as described below with reference to FIGS. 8, 9 and 10. The common function blocks and common data blocks are encoded, at block 412, and a modified version of the original file is output for use in performing byte-level file differencing.

Figure 5:
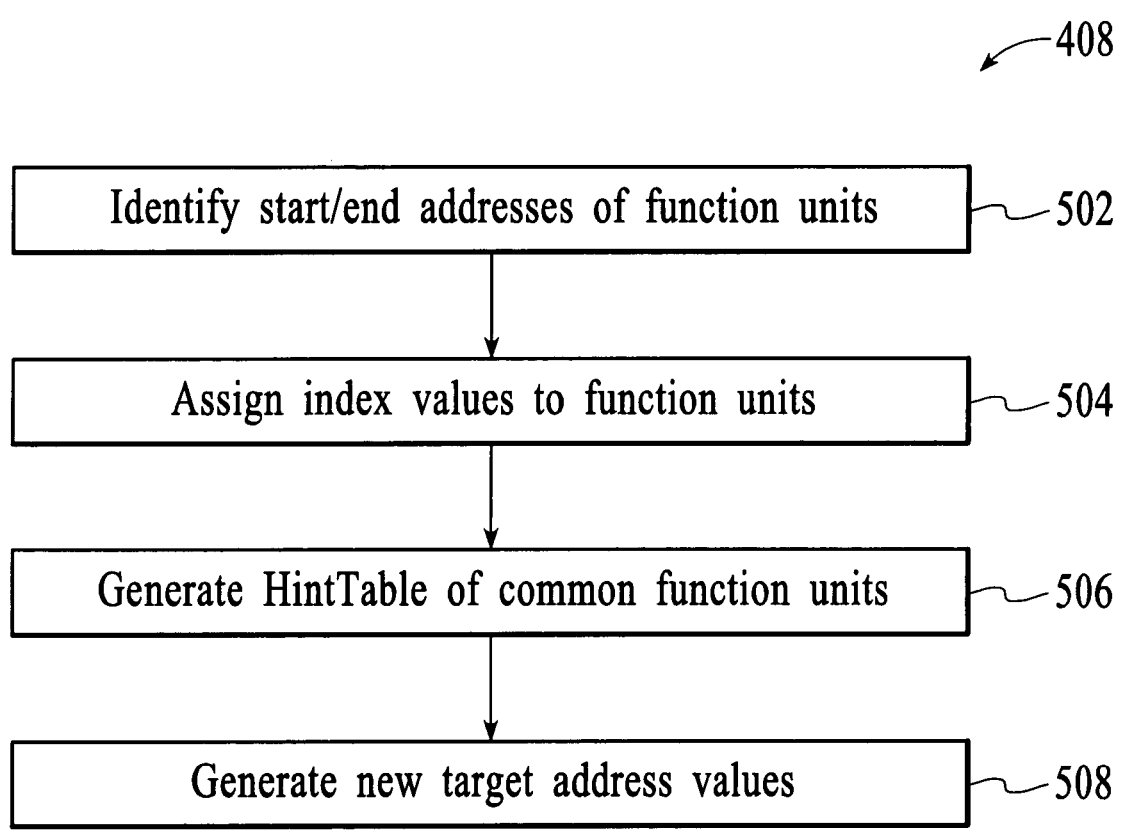
FIG. 5 is a flow diagram for pre-processing code (text) sections of different versions of an electronic file, under the embodiment of FIG. 4.

FIG. 5 is a flow diagram 408 for pre-processing code (text) sections of different versions of an electronic file, under the embodiment of FIG. 4. Generally, the code (text) sections of the files are made up of one or more function units or blocks. The pre-processing of code (text) sections of an embodiment begins with the identification of start and end addresses of each function unit of the original and the new files, at block 502, where the function units of the original files are referred to herein as "original function units" and the function units of the new files are referred to herein as "new function units." The start and end addresses of the function units are identified using map files, but are not so limited.

The pre-processor next assigns a unique index or index value to each unique function unit, at block 504. This assignment of index values to unique function units supports identification of function units that are common to both the original and new file versions. Consequently, when the same function unit is found in both the original and the new versions of the file, that function is assigned a common index value, but the embodiment is not so limited.

As an example, consider an original file version that includes original function units F1, F2, F3, and F4, and a new file version that includes new function units F1, F2, F3, and F5. If the pre-processor indexes function units F1, F2, F3, F4, and F5 using index values 1, 2, 3, 4, and 5, respectively, the following table is assembled for the original file version:

| Index | startAddressV1 | endAddressV1 |
|-------|----------------|--------------|
| 1     | 0x8040         | 0x8062       |
| 2     | 0x8062         | 0x8080       |
| 3     | 0x8086         | 0x809e       |
| 4     | 0x9056         | 0x90a8       |

Likewise, the following table is assembled for the new file version:

| Index | startAddressV2 | endAddressV2 |
|-------|----------------|--------------|
| 1     | 0x8060         | 0x8082       |
| 2     | 0x8082         | 0x80a0       |
| 3     | 0x80a6         | 0x80be       |
| 5     | 0x90e6         | 0x9138       |

In both of these tables, startAddress is generally defined as the starting address of the corresponding function unit; therefore "startAddressV1" is the startAddress of a function unit of the original file and "startAddressV2" is the startAddress of a function unit of the new file. Further, the endAddress is generated by adding the function unit size to the starting address of the function unit so that endAddress=startAddress+function unit size, but the embodiment is not so limited. Consequently, endAddressV1 is defined as an endAddress for a function unit of the original file, while endAddressV2 is defined as an endAddress for a function unit of the new file. This definition of ending address is also applied to data units herein, but is not so limited.

Continuing, the pre-processor generates a HintTable of common function units using information of the index value, starting address, and ending address from the tables above, at block 506. The HintTable includes information of the common function units assembled in one table, including index value, the starting and ending addresses of the original function units of the original file version (V1), and the starting and ending addresses of the new function units of the new file version (V2). The information of the HintTable is arranged using any number of techniques known in the art. Using the information above, the HintTable of an embodiment is generated as follows:

| Index | startAddrV1 | endAddrV1 | startAddrV2 | endAddrV2 |
|-------|-------------|-----------|-------------|-----------|
| 1     | 0x8040      | 0x8062    | 0x8060      | 0x8082    |
| 2     | 0x8062      | 0x8080    | 0x8082      | 0x80a0    |
| 3     | 0x8086      | 0x809e    | 0x80a6      | 0x80be    |

Figure 6:
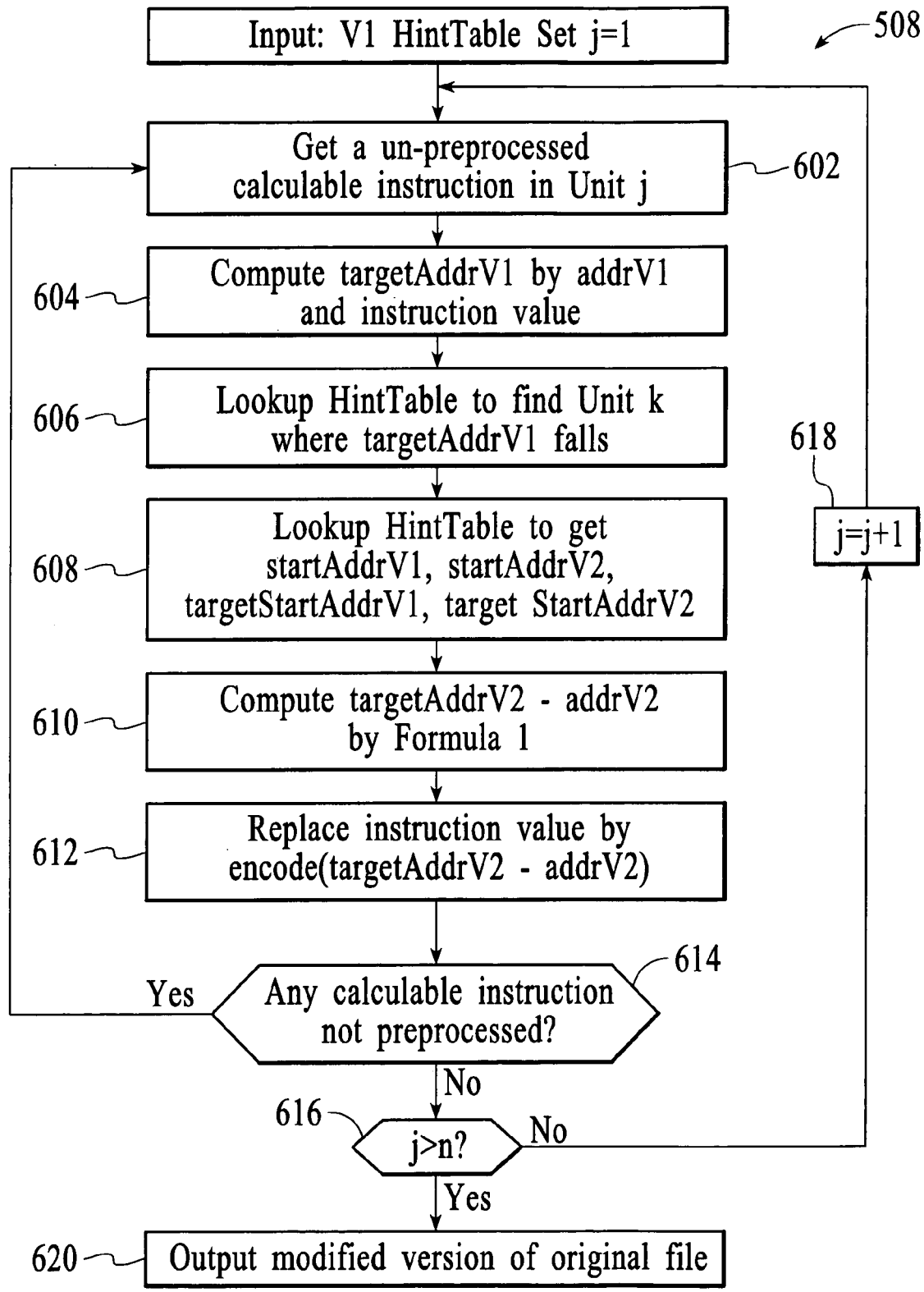
FIG. 6 is a flow diagram for generating new target address values for the code (text) sections of an original version of an electronic file, under the embodiment of FIG. 5.

The pre-processor continues with the generation of new target address values for instructions of the original function units that include target addresses, at block 508. FIG. 6 is a flow diagram 508 for generating new target address values for the code (text) sections of an original version of an electronic file, under the embodiment of FIG. 5.

In describing generation of new target address values, the various addresses associated with the function units are described using particular notation, as follows. The instruction address is generally referred to herein using the notation "addr"; therefore, "addrV1" refers to an instruction address in the original function unit, while "addrV2" refers to an instruction address in the new function unit. The target address is generally referred to herein using the notation "targetAddr"; therefore, "targetAddrV1" refers to a target address in the original function unit, while "targetAddrV2" refers to the corresponding target address in the new function unit. Further, the start address of the original function unit that includes targetAddrV1 is referenced herein using the notation "targetStartAddrV1," is the start address of the original function unit that includes targetAddrV1, and the start address of the new function unit that includes targetAddrV2 is referenced herein using the notation "targetStartAddrV2."

Figure 7:
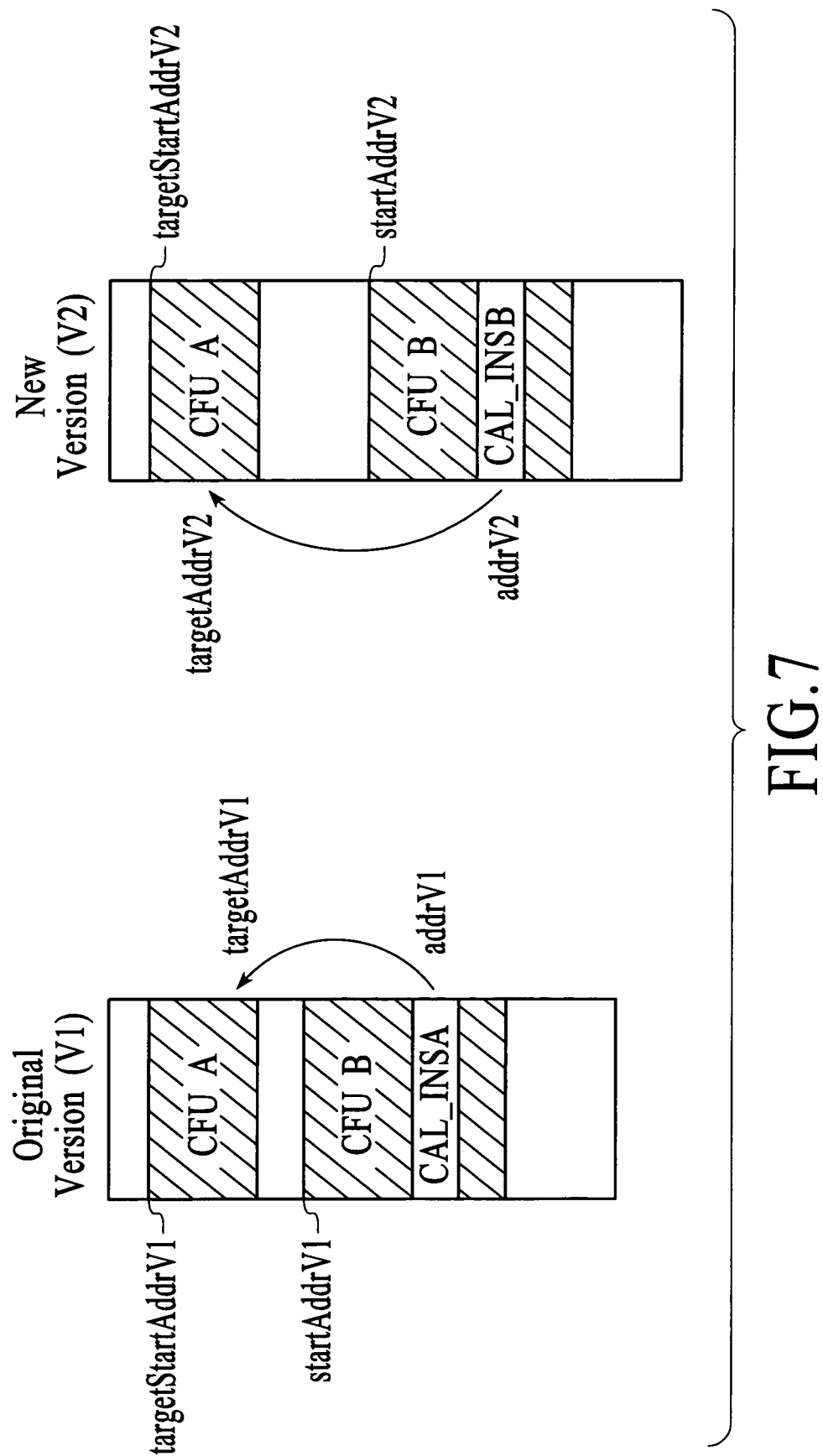
FIG. 7 is a block diagram of an original version and a new version of a file, under an embodiment, showing the different addresses (and corresponding notations) described with reference to generation of new target address values for the code (text) sections of an original version of an electronic file.

FIG. 7 is a block diagram of an original version V1 and a new version V2 of a file, under an embodiment, showing the different addresses (and corresponding notations) described with reference to generation of new target address values for the code (text) sections of an original version of an electronic file. A first common function unit CFU A and a second common function unit CFU B are common to both the original V1 and the new V2 versions. Common function unit CFU B of original version V1 has a starting address startAddrV1, and includes a calculable instruction cal_insA located at instruction address addrV1. The calculable instruction is described below. Common function unit CFU A of original version V1 has a starting address targetStartAddrV1, and includes the target address targetAddrV1 of the calculable instruction cal_insA.

Likewise, common function unit CFU B of new version V2 has a starting address startAddrV2, and includes a calculable instruction cal_insB located at instruction address addrV2. Common function unit CFU A of new version V2 has a starting address targetStartAddrV2, and includes the target address targetAddrV2 of the calculable instruction cal_insB.

Returning to FIG. 6, generation of new target address values begins by reading an un-preprocessed calculable instruction from original function unit j of the original file version, at block 602, where j is a counter value initialized to a value of one (1) and subsequently incremented by one each time until j=n, where n represents the total number of common function units between the original version and the new version.

The current target address of the calculable instruction is then generated or calculated, at block 604, as follows. For any instruction that includes a target address, such as program counter-related jump instructions and load/store instructions for example, the target address is computed using the current instruction address and the corresponding instruction decoding. Using the above-referenced notation, the current target address computation becomes targetAddrV1=addrV1+decode(instruction), or, alternatively, decode(instruction)=targetAddrV1−addrV1.

If the value [targetAddrV1−addrV1] is known, the instruction can also be calculated based on the corresponding encoding scheme as instruction=encode(targetAddrV1−addrV1).

This type of instruction is referred to as a calculable instruction, referred to herein as "cal_ins", and the value (targetAddrV1−addrV1) is referred to as the calculable instruction's value or the "instruction value."

For calculable instructions in common function units, the pre-processor of an embodiment generates the instruction value in the new version of a common function unit using the instruction value in the original version along with the original function unit starting addresses and the new function unit starting addresses. Using the above-referenced notation, therefore, the instruction value in the new version (targetAddrV2−addrV2) is generated or computed using the instruction value in the original version (targetAddrV1−addrV1), startAddrV1, targetStartAddrV1, startAddrV2, and targetStartAddrV2.

Consequently, upon generation of the target address of the original file (targetAddrV1), the pre-processor accesses the HintTable to identify k, the function unit of the original file version that includes the target address targetAddrV1, at block 606. With original function unit j and the identity of its targeted function unit k, the pre-processor reads startAddrV1, startAddrV2, targetStartAddrV1, and targetStartAddrV2 from the HintTable, at block 608.

Continuing, the pre-processor now generates the instruction value (targetAddrV2−addrV2) for cal_insB to replace the instruction value of cal_insA, at block 610, as follows. The pre-processor of an embodiment operates under at least two assumptions, but is not so limited. The first assumption assumes that a common function unit having the same size in both the original version and the new version has the same instruction structure across both the original and new versions, where the instruction structure includes the instruction type and instruction order. The second assumption assumes that for any calculable instruction in a common function unit satisfying the first assumption, when the calculable instruction is a function call or the target address of the calculable instruction falls in a common function unit that also satisfies the first assumption, two invariants generally hold across both the original and new versions as follows:

addrV1−startAddrV1=addrV2−startAddrV2 and targetAddrV1−targetStartAddrV1=targetAddrV2−targetStartAddrV2.

Thus, in accordance with the two assumptions, the pre-processor generates the new instruction value (targetAddrV2−addrV2) for cal_insA, at block 610, as targetAddrV2−addrV2=(targetAddrV1−addrV1)+(targetStartAddrV2−targetStartAddrV1)−(startAddrV2−startAddrV1), referred to herein as Formula 1.

Using the new instruction value of cal_insA, at block 612, the pre-processor modifies cal_insA as instruction=encode(targetAddrV2−addrV2).

The original instruction at address addrV1 of the original version, cal_insA, is then replaced with the new instruction.

The pre-processor subsequently determines if any calculable instructions of the original function unit j remain un-preprocessed, at block 614. When calculable instructions remain un-preprocessed, the pre-processor returns to read another, or alternatively the next, un-preprocessed calculable instruction from the original function unit j, at block 602, and pre-processing continues as described above.

When all calculable instructions of original function unit j have been pre-processed, as determined at block 614, the preprocessor determines if the value in counter j is greater than a value n, at block 616. A determination that j is not greater than n indicates that there are common function units that have not been pre-processed, so the value in counter j is incremented by one, at block 618, and pre-processing continues as described above.

A determination that j is greater than n indicates that all function units of the original file version have been pre-processed. Consequently, the pre-processor outputs a modified version of the original file that includes an approximated version of the new file, at block 620.

Figure 8:
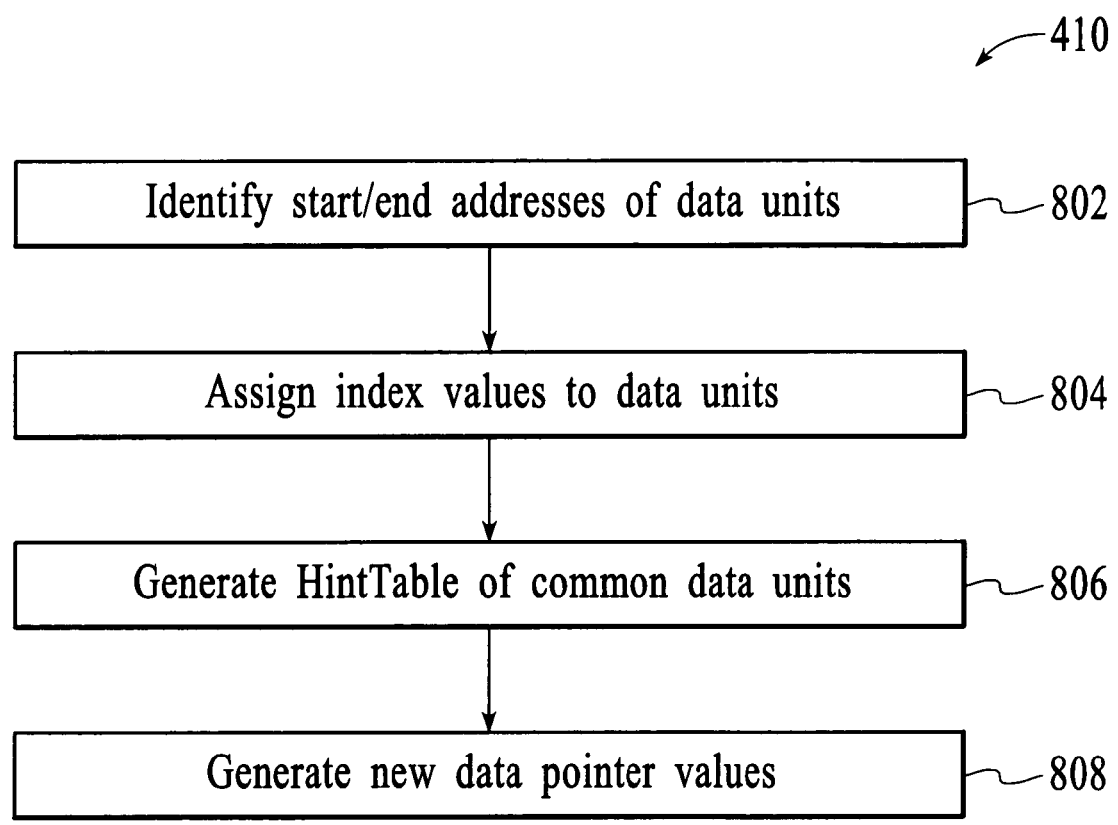
FIG. 8 is a flow diagram for pre-processing data sections of original and new versions of an electronic file, under the embodiment of FIG. 4.

As described above with reference to FIG. 4, the pre-processor and the approximation routines also function to remove secondary changes according to data model assumptions, at block 410, in addition to removing the secondary changes according to text (code) model assumptions. FIG. 8 is a flow diagram 410 for pre-processing data sections of original and new versions of an electronic file, under the embodiment of FIG. 4. Generally, the data sections of the files are made up of one or more global variable units or blocks, referred to herein as "data units."

The pre-processing of data sections of an embodiment begins with the identification of start and end addresses of each data unit of the original and new files, at block 802, where the data units of the original files are referred to herein as "original data units" and the data units of the new files are referred to herein as "new data units." The start and end addresses of the data units are identified using map files, but are not so limited.

The pre-processing next assigns a unique index or index value to each unique data unit, at block 804. This assignment of index values to unique data units supports identification of data units that are common to both the original and new file versions. Consequently, when the same data unit is found in both the original and the new versions of the file, that data unit is assigned a common index value, but the embodiment is not so limited. The assignment of index values to unique data units is the same as the assignment of index values to unique function units described above, but is not so limited. Likewise, the generation of tables organized according to index value and including the starting address and ending address for each data unit is the same as the generation of tables described above for the function units of the original and new file versions. Alternative embodiments, however, can assign index values and generate tables using any number of techniques known in the art.

Continuing, the pre-processor generates a HintTable of common data units using information of the index value, starting address, and ending address from the tables above, at block 806. The HintTable includes information of the common data units assembled in one table, including index value, the starting and ending addresses of the original data units of the original file version (V1), and the starting and ending addresses of the new data units of the new file version (V2). Generation of the HintTable is as described above with reference to the HintTable of common function units, but the HintTable can be generated in alternative embodiments using any number of techniques known in the art.

Figure 9:
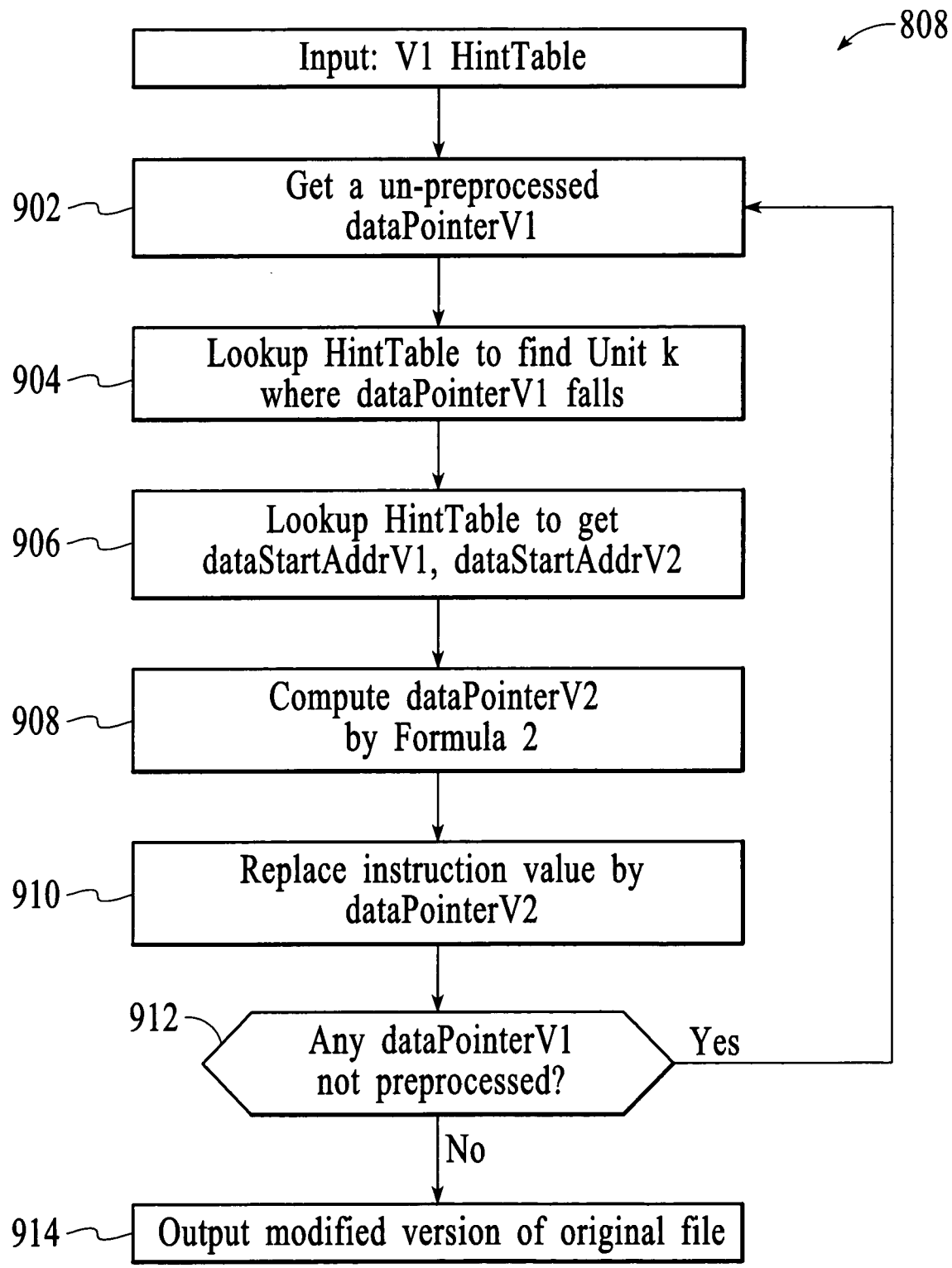
FIG. 9 is a flow diagram for generating new data pointer values for the data sections of an original version of an electronic file, under the embodiment of FIG. 8.

The pre-processor continues by generating new data pointer values for data pointers of the original version, at block 808. FIG. 9 is a flow diagram 808 for generating new data pointer values for the data pointers in the original version of an electronic file, under the embodiment of FIG. 8.

A data pointer is an instruction that points to some data in a data unit. The notation used herein in describing generation of new data pointer values follows. The address of an instruction that includes a data pointer is generally referred to herein using the notation "dataPointer"; therefore, "dataPointerV1" refers to a dataPointer in the original version, while "dataPointerV2" refers to a dataPointer in the new version. The start address of a data unit including data pointed to by a data pointer is referred to herein using the notation "dataStartAddr"; therefore, "dataStartAddrV1" refers to a dataStartAddr in the original version, while "dataStartAddrV2" refers to a dataStartAddr in the new version.

Figure 10:
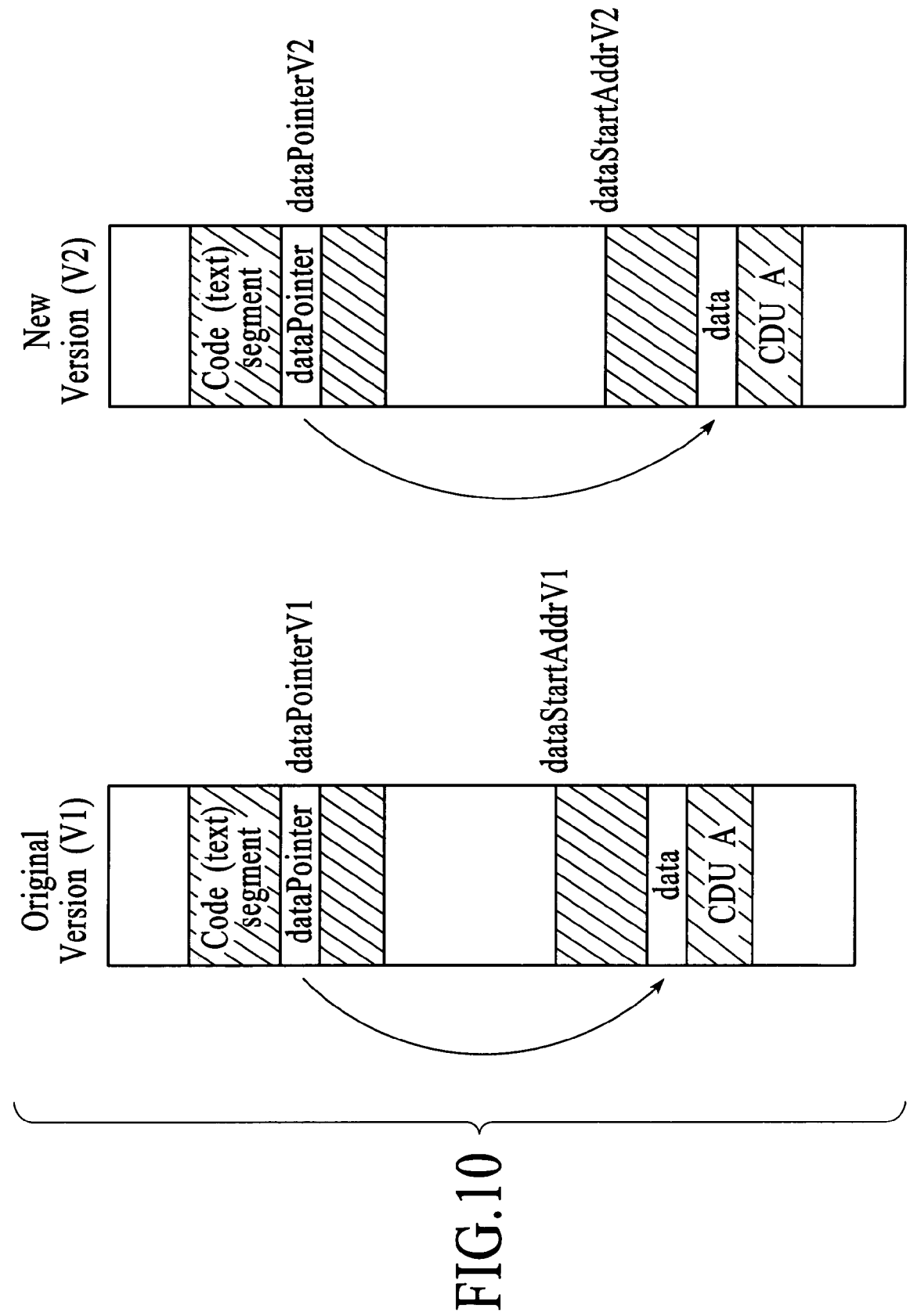
FIG. 10 is a block diagram of an original version and a new version of a file, under an embodiment, showing the different addresses (and corresponding notations) used in generating new data pointer values for an original version of an electronic file.

FIG. 10 is a block diagram of an original version V1 and a new version V2 of a file, under an embodiment, showing the different addresses (and corresponding notations) used in generating new data pointer values for an original version of an electronic file. The original V1 and new V2 versions both include a code (text) segment and a data segment. The data segment includes a common data unit CDU A that is common to both the original V1 and the new V2 file versions. The original version V1 includes a data pointer dataPointerV1 in the code (text) segment which points to some data in common data unit CDU A of the original version, where the start address of CDU A in the original version V1 is dataStartAddrV1. Likewise, the new version V2 includes a data pointer dataPointerV2 in the code (text) segment which points to some data in common data unit CDU A of the new version V2, where the start address of CDU A in the new version V2 is dataStartAddrV2. The dataStartAddr addresses are from map files associated with the software images of the original V1 and new V2 versions of the file.

Returning to FIG. 9, generation of new data pointer values begins by identifying an un-preprocessed data pointer in the original version, at block 902. The pre-processor of an embodiment generates the data pointer value (dataPointerV2) of the new version using the pointer value in the original version (dataPointerV1) along with the start addresses of the data unit including data pointed to by dataPointerV1 (dataStartAddrV1) and the start address of its corresponding data unit in the new version (dataStartAddrV2), as described below. This is done by accessing the HintTable to identify the k, the data unit in the original version which includes data pointed to by dataPointerV1, at block 904. With the identity of the data unit k, the pre-processor reads dataStartAddrV1 and dataStartAddrV2 from the HintTable, at block 906.

The pre-processor subsequently generates the data pointer value (dataPointerV2) to replace dataPointerV1, at block 908, as follows. The pre-processor of an embodiment operates under at least two additional assumptions with regard to data units, referred to herein as the third and fourth assumptions, but is not so limited. The third assumption assumes that a common data unit having the same size in both the original version and the new version has the same data structure across both the original and new versions, where the data structure includes the type, size, and order of the data variables. The fourth assumption assumes that for any data pointer in a common data unit satisfying the third assumption, an invariant generally holds across both the original and new versions as follows:

$$dataPointerV1-dataStartAddrV1=dataPointerV2-dataStartAddrV2.$$

Thus, in accordance with the third and fourth assumptions, the pre-processor generates the new data pointer value (dataPointerV2) for the new data unit, at block 908, as $$dataPointerV2=dataPointerV1+(dataStartAddrV2-dataStartAddrV1),$$

referred to herein as Formula 2.

Using the data pointer value dataPointerV2, at block 910, the pre-processor replaces dataPointerV1 with dataPointerV2 at the corresponding address in the original version. The pre-processor subsequently determines if any data pointers of the original data unit remain un-preprocessed, at block 912.

When data pointers of the original data unit remain un-preprocessed, the pre-processor returns to read another, or alternatively the next, un-preprocessed data pointer from the original data unit, at block 902, and pre-processing continues as described above. When all data pointers of the original data unit have been pre-processed, as determined at block 912, the preprocessor outputs a modified version of the original file including an approximated version of the new file, at block 914.

The starting and ending addresses of the common function units and the common data units, as used above in the HintTables, are collectively referred to as "algorithm hints" or "hints" because of their use in determining relative positioning of common units between different file versions. As such, the hints are transferred to client devices receiving the difference or delta file for use in recovering the new file version from the delta file and the original file, as described above. Because transfer of the hints is performed via the same low bandwidth channel used for transfer of the delta file and other information to the client device, the pre-processor of an embodiment performs hint merging to merge common function units and common data units of the HintTable without affecting the performance of the pre-processing algorithms or routines. This merging reduces the size of the file that includes the hints and, consequently, the amount of information transferred to the client devices.

Figure 11:
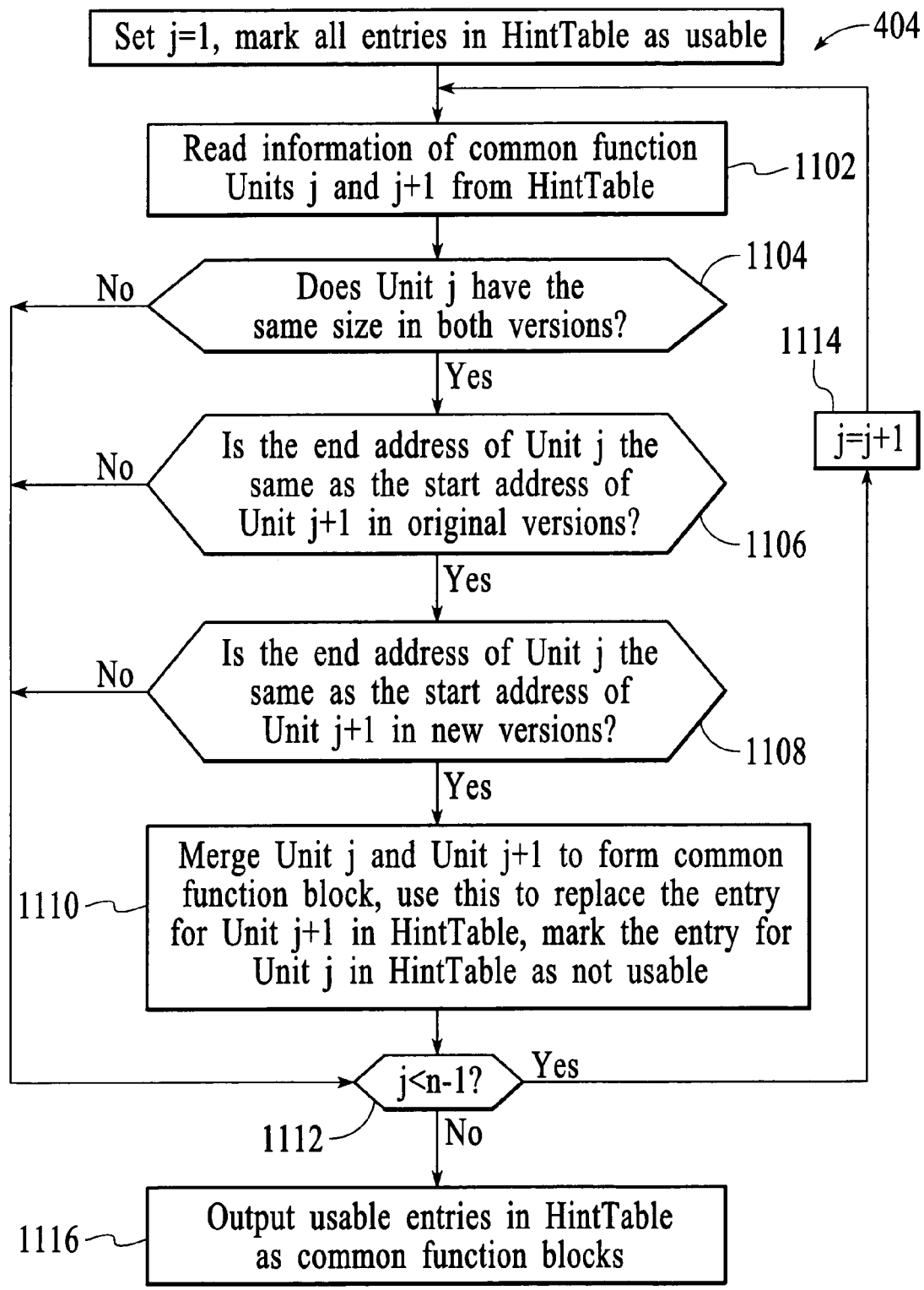
FIG. 11 is a flow diagram of hint merging of common function units, under the embodiment of FIG. 4.

Using the common function units resulting from the pre-processing of code (text) sections described above, and returning to FIG. 4, the pre-processor under the control of hint merging routines or algorithms merges the common function units to form common function blocks, at block 404. FIG. 11 is a flow diagram of hint merging 404 of common function units, under the embodiment of FIG. 4.

Figure 12:
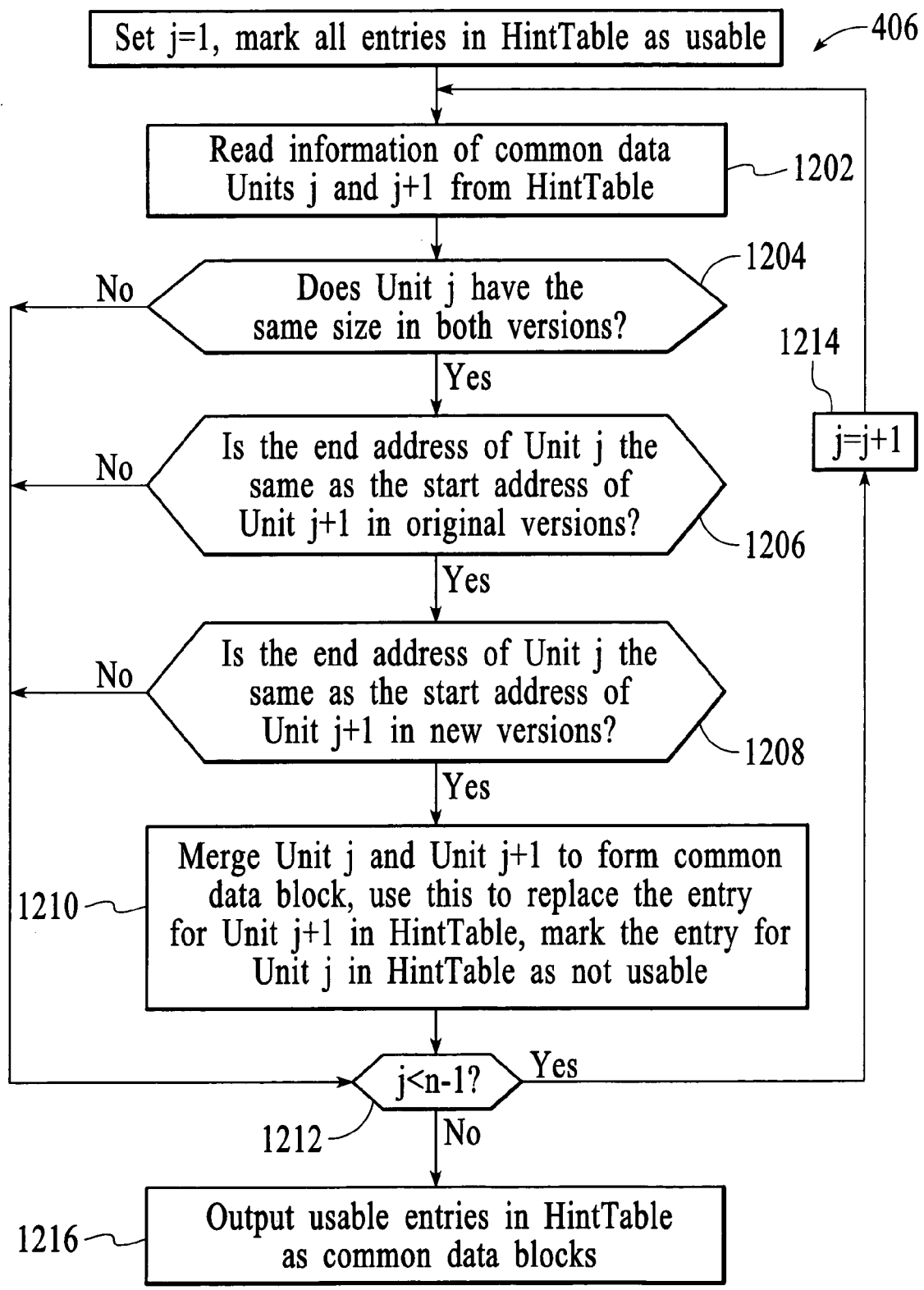
FIG. 12 is a flow diagram of hint merging of common data units, under the embodiment of FIG. 4.

Likewise, the pre-processor uses the common data units resulting from the pre-processing of data sections described above to merge the common data units to form common data blocks, at block 406. FIG. 12 is a flow diagram of hint merging 406 of common data units, under the embodiment of FIG. 4. Hint merging of the common function units and common data units is described in turn below.

While hint merging of common function units and common data units is described separately herein for clarity, the embodiment can perform the operations associated with the merging in any order and any combination. Regarding notation, the starting address of a function or data unit is generally referred to herein using the notation "startAddress," as described above; therefore, "startAddress V1" refers to a start address of an original function or data unit, while "startAddress V2" refers to the corresponding start address in the new function or data unit. Likewise, the ending address of a function or data unit is generally referred to herein using the notation "endAddress"; therefore, "endAddress V1" refers to an ending address of an original function or data unit, while "endAddress V2" refers to the corresponding ending address in the new function or data unit.

As described above with reference to FIG. 5, a HintTable of common function units was generated that includes information of the common function units assembled in one table, including index value, the starting and ending addresses of the original function units of the original file version V1, and the starting and ending addresses of the new function units of the new file version V2. The HintTable provided above is used as an example in describing the hint merging of common function units, but the embodiment is not so limited:

| Index | startAddrV1 | endAddrV1 | startAddrV2 | endAddrV2 |
|-------|-------------|-----------|-------------|-----------|
| 1 | 0x8040 | 0x8062 | 0x8060 | 0x8082 |
| 2 | 0x8062 | 0x8080 | 0x8082 | 0x80a0 |
| 3 | 0x8086 | 0x809e | 0x80a6 | 0x80be |

With reference to FIG. 4 and FIG. 11 as well as the HintTable, operation of hint merging 404 of common function units begins with the pre-processor marking all n entries of the HintTable as usable, setting counter j=1, and reading the original and new versions of function unit j and unit (j+1) from the associated HintTable, at block 1102. In this example, the values of unit j and unit (j+1) correspond to the index values of the hint table, where j=1, 2, ... (n−1), but are not so limited. Further, the value of j is initially set equal to 1 and is subsequently incremented using methods known in the art as the hint merging 404 progresses and common units are processed. Therefore, the information of common function units associated with index values 1 and 2 (j+1=1+1=2) is read, at block 1102.

The pre-processor determines, at block 1104, whether the original version V1 and new version V2 of common function unit j are equal in size. This determination is made by taking a difference between the starting and ending addresses of the original V1 and new V2 versions as $$endAddrV1(j)-startAddrV1(j)=endAddrV2(j)-startAddrV2(j),$$

but is not so limited. When the original V1 and new V2 versions have different size files, operation proceeds to determine whether the value of j is less than the quantity (n−1), at block 1112.

When the original version V1 and the new version V2 are equal in size, the pre-processor determines whether the ending address of the original version V1 of common function unit j is the same as the starting address of the original version V1 of common function unit (j+1) as $$endAddrV1(j)=startAddrV1(j+1),$$

at block 1106, but is not so limited. When the ending address of the original version V1 of common function unit j is different from the starting address of the original version V1 of common function unit (j+1), operation proceeds to determine whether the value of j is less than the quantity (n−1), at block 1112.

When the ending address of the original version V1 of common function unit j is the same as the starting address of the original version V1 of common function unit (j+1), the pre-processor determines whether the ending address of the new version V2 of common function unit j is the same as the starting address of the new version V2 of common function unit (j+1) as $$endAddrV2(j)=startAddrV2(j+1),$$

at block 1108, but is not so limited. When the ending address of the new version V2 of common function unit j is different from the starting address of the new version V2 of common function unit (j+1), operation proceeds to determine whether the value of j is less than the quantity (n−1), at block 1112.

When the ending address of the new version V2 of common function unit j is the same as the starting address of the new version V2 of common function unit (j+1), the pre-processor merges the information of common function unit j and common function unit (j+1) to form a common function block to replace the entry for unit (j+1), then marks the entry for unit j as not usable, at block 1110. Operation then proceeds to determine whether the value of j is less than the quantity (n−1), at block 1112.

The pre-processor determines, at block 1112, whether the value of j is less than the quantity (n−1). When the value of j equals the quantity (n−1), indicating that all function units have been preprocessed, operation proceeds to output all usable entries as common function blocks, at block 1116, and operation returns. When the value of j is less than the quantity (n−1), indicating that function units remain un-preprocessed, the value of j is incremented, at block 1114, and operation proceeds to read information of common function units corresponding to the new value of j, at block 1102. Pre-processing then continues as described above.

An example involving hint merging of common function units is described below, with reference to FIG. 11 and the HintTable. Operation begins with the pre-processor marking all three entries usable and reading the original and new versions of function units 1 and 2 from the HintTable. The pre-processor then determines whether the original version V1 and new version V2 of common function unit 1 are equal in size. This determination is made by taking a difference between the starting and ending addresses of the original V1 and new V2 versions as $$endAddrV1(1)-startAddrV1(1)=endAddrV2(1)-startAddrV2(1).$$

Substituting the actual values from the HintTable results in $$(0x8062)-(0x8040)=(0x8082)-(0x8060).$$

As the original version V1 and the new version V2 are equal in size, the pre-processor next determines whether the ending address of the original version V1 of common function unit 1 is the same as the starting address of the original version V1 of common function unit 2 as $$endAddrV1(1)=startAddrV1(2).$$

Substituting the actual values from the HintTable results in a determination that the ending address of the original version V1 of common function unit 1 is the same as the starting address of the original version V1 of common function unit 2 as (0x8062)=(0x8062).

Because the ending address of the original version V1 of common function unit 1 is the same as the starting address of the original version V1 of common function unit 2, a determination is next made as to whether the ending address of the new version V2 of common function unit 1 is the same as the starting address of the new version V2 of common function unit 2 as endAddrV2(1)=startAddrV2(2).

Substituting the actual values from the HintTable results in a determination that the ending address of the new version V2 of common function unit 1 is the same as the starting address of the new version V2 of common function unit 2 as (0x8082)=(0x8082).

In response to the determination that the ending address of the new version V2 of common function unit 1 is the same as the starting address of the new version V2 of common function unit 2, the pre-processor merges the information of common function unit 1 and common function unit 2 to form a common function block as follows:

| Index | startAddrV1 | endAddrV1 | startAddrV2 | endAddrV2 | |
|---|---|---|---|---|---|
| 1 | 0x8040 | 0x8062 | 0x8060 | 0x8082 | non-usable |
| 2 | 0x8040 | 0x8080 | 0x8060 | 0x80a0 | usable |
| 3 | 0x8086 | 0x809e | 0x80a6 | 0x80be | usable |

Continuing the example, the pre-processor next reads the original and new versions of function units 2 and 3 from the HintTable. The pre-processor determines whether the original version V1 and new version V2 of common function unit 2 are equal in size. This determination is made by taking a difference between the starting and ending addresses of the original V1 and new V2 versions as endAddrV1(2)−startAddrV1(2)=endAddrV2(2)−startAddrV2(2).

Substituting the actual values from the HintTable results in (0x8080)−(0x8040)=(0x80a0)−(0x8060), which shows the original version V1 and the new version V2 are equal in size.

The pre-processor next determines whether the ending address of the original version V1 of common function unit 2 is the same as the starting address of the original version V1 of common function unit 3 as endAddrV1(2)=startAddrV1(3).

Substituting the actual values from the HintTable results in a determination that the ending address of the original version V1 of common function unit 2 is different from the starting address of the original version V1 of common function unit 3 as (0x8080) not equal (0x8086).

Because the ending address of the original version V1 of common function unit 2 is not the same as the starting address of the original version V1 of common function unit 3, operation returns and common function units 2 and 3 are not merged to form a common function block.

After merging common function units, the usable entries of the HintTable of the above example are as follows for the output:

| Index | startAddrV1 | endAddrV1 | startAddrV2 | endAddrV2 |
|---|---|---|---|---|
| 2 | 0x8040 | 0x8080 | 0x8060 | 0x80a0 |
| 3 | 0x8086 | 0x809e | 0x80a6 | 0x80be |

The pre-processor of an embodiment performs hint merging of common data units in a manner similar to that described above with regard to the common function units. With reference to FIG. 4 and FIG. 12, operation of hint merging 406 of common data units begins with the pre-processor marking all n entries of the HintTable, setting the counter j=1, and reading the original and new versions of data unit j and (j+1) from the associated HintTable, at block 1202. The values of unit j and unit (j+1) correspond to the index values of the hint table, where j=1, 2, . . . (n−1), but are not so limited.

The pre-processor determines, at block 1204, whether the original version V1 and new version V2 of common data unit j are equal in size. This determination is made by taking a difference between the starting and ending addresses of the original V1 and new V2 versions as endAddrV1(j)−startAddrV1(j)=endAddrV2(j)−startAddrV2(j), but is not so limited. When the original V1 and new V2 versions have different size files, operation proceeds to determine whether the value of j is less than the quantity (n−1), at block 1212.

When the original version V1 and the new version V2 are equal in size, the pre-processor determines whether the ending address of the original version V1 of common data unit j is the same as the starting address of the original version V1 of common data unit (j+1) as endAddrV1(j)=startAddrV1(j+1), at block 1206, but is not so limited. When the ending address of the original version V1 of common data unit j is different from the starting address of the original version V1 of common data unit (j+1), operation proceeds to determine whether the value of j is less than the quantity (n−1), at block 1212.

When the ending address of the original version V1 of common data unit j is the same as the starting address of the original version V1 of common data unit (j+1), the pre-processor determines whether the ending address of the new version V2 of common data unit j is the same as the starting address of the new version V2 of common data unit (j+1) as endAddrV2(j)=startAddrV2(j+1), at block 1208, but is not so limited. When the ending address of the new version V2 of common data unit j is different from the starting address of the new version V2 of common data unit (j+1), operation proceeds to determine whether the value of j is less than the quantity (n−1), at block 1212.

When the ending address of the new version V2 of common data unit j is the same as the starting address of the new version V2 of common data unit (j+1), the pre-processor merges the information of common data unit j and common data unit (j+1) to form a common data block to replace the entry for unit (j+1), then marks the entry for unit j as not usable, at block 1210. Operation then proceeds to determine whether the value of j is less than the quantity (n−1), at block 1212.

The pre-processor determines, at block 1212, whether the value of j is less than the quantity (n−1). When the value of j equals the quantity (n−1), indicating that all function units have been preprocessed, operation proceeds to output usable entries in the HintTable as common data blocks, at block 1216, and operation returns. When the value of j is less than the quantity (n−1), indicating that function units remain un-preprocessed, the value of j is incremented, at block 1214, and operation proceeds to read information of common data units corresponding to the new value of j, at block 1202. Pre-processing then continues as described above.

The systems and methods described for pre-processing different versions of an electronic file can be applied to software and executable files of any number of processing and/or processor-based systems using any number of instruction architectures. For example, the systems and methods herein can be used in the ARM® architecture, as described in the "ARM Architecture Reference Manual," $2^{nd}$ Edition, by D. Jagger and D. Seal. The ARM® architecture is a microprocessor architecture based on a $16/32$-bit embedded Reduced Instruction Set Computer (RISC) core, and incorporating the Thumb 16-bit instruction set. When used in the ARM® architecture, for example, the calculable instructions referred to above would include "branch with link (BL)" and "branch with link and change mode to ARM/Thumb (BLX)" instructions of the ARM/Thumb instruction set. Further, the data pointer referred to above includes the DCD instruction of the ARM/Thumb instruction set.

As an example of a device and/or system using the pre-processing described above, the computing devices receiving and using the delta file may be client devices that host corresponding software applications in need of updating, for example cellular telephones, mobile electronic devices, mobile communication devices, personal digital assistants, and other processor-based devices. This support is provided for all mobile device software ranging from firmware to embedded applications by enabling carriers and device manufacturers to efficiently distribute electronic file content and applications via their wireless infrastructure.

Another example of systems that benefit from the pre-processing described above includes systems using wired serial connections to transfer the delta file from a device hosting the file difference generator to a device hosting the file update generator. These systems typically have slow transfer rates and, because the transfer rates are slow, a reduction in the size of the delta file is a way to realize faster transfer times.

Yet another example of systems that benefit from use of the pre-processing includes wireless systems using radio communications to transfer the delta file from a device hosting the file difference generator to a device hosting the file update generator. While suffering from low reliability associated with the wireless connections, these systems also have slow transfer rates. The use of a smaller delta file in these systems provides several advantages. For example, the smaller file size results in a faster delta file transfer time. The faster transfer time, while saving time for the device user, reduces the opportunity for the introduction of errors into the delta file, thereby increasing system reliability. Also, with cellular communications, the reduced transfer time results in a cost savings for the consumer who is typically charged by the minute for service.

As another advantage, the smaller delta file reduces the bandwidth required to transfer the delta files to client devices. The reduced bandwidth allows for the support of more client devices via the allocated channels. As with the reduced transfer time, this too results in a reduction in operating costs for the wireless service provider.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, shall refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems and communication systems, not only for the file differencing systems described above.

The elements and acts of the various embodiments described above can be combined to provide further embodiments. These and other changes can be made to the invention in light of the above detailed description.

All of the above references and United States patents and patent applications are incorporated herein by reference. Aspects of the invention can be modified, if necessary, to employ the systems, functions and concepts of the various patents and applications described above to provide yet further embodiments of the invention.

In general, in the following claims, the terms used should not be construed to limit the invention to the specific embodiments disclosed in the specification and the claims, but should be construed to include all processing systems that operate under the claims to provide file differencing. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in computer-readable medium, other aspects may likewise be embodied in computer-readable medium. Accordingly, the inventors reserve the right to add additional claims after filing the application to pursue such additional claim forms for other aspects of the invention.

We claim:

1. A system for updating electronic files comprising:
a first device for generating a difference files that includes coded differences between an original version and a new version of an electronic file, wherein the first device includes at least one component configured for:
identifying differences between the original version and the new versions corresponding to address shifts resulting from at least one of code line deletion, code line addition, and code line modification;
removing the identified differences in text sections common to the original version and the new versions by modifying target addresses of instructions of the original version using at least one relationship between addresses of text sections of the original version and corresponding text sections of the new version;
generating a modified version of the original version that includes the instructions having modified target addresses;
generating the difference file using the new version and the modified version of the original version; and
a second device that receives the difference file and generates the new version in the second device using the difference file.

2. The system of claim 1, wherein removing further includes:
identifying first and second text sections that are common between the original version and the new versions, wherein the first text section in the original version includes a first calculable instruction and the second text section in the new version includes a second calculable instruction;
identifying third and fourth text sections that are common between the original version and the new versions, wherein the third text section in the original version includes a first target address that corresponds to the first calculable instruction, wherein the fourth text section in the new version includes a second target address that corresponds to the second calculable instruction;
generating a second instruction value from the second calculable instruction by modifying the first instruction value using a first difference between starting addresses of the third and fourth function units and using a second difference between starting addresses of the first and second function units; and
replacing a first instruction value of the first calculable instruction with the second instruction value.

3. The system of claim 1, further comprising removing the identified differences in instructions including data pointers that point to data sections common to the original version and the new versions by modifying data pointer values in the original version, wherein modifying data pointer values uses a difference between starting addresses of data sections in the original version pointed to by a current data pointer and starting addresses of corresponding data sections in the new version.

4. The system, of claim 3, wherein removing identified differences in instructions including data pointers further comprises:
identifying first and second code segments that are common between the original version and the new versions, wherein the first code segment in the original version includes a first data pointer and the second code segment in the new version includes a second data pointer;
identifying first and second data units that are common between the original version and the new versions, wherein the first data unit in the original version includes a first target address that corresponds to the first data pointer, wherein the second data unit in the new version includes a second target address that corresponds to the second data pointer;
generating a second data pointer value from the second data pointer by modifying a first data pointer value using a difference between starting addresses of the first and second data units; and
replacing a first data pointer value of the first data pointer with the second data pointer value.

5. The system of claim 1, wherein the second device is at least one processor-based device selected from among personal computers, portable computing devices, cellular telephones, portable communication devices, and personal digital assistants.

6. The system of claim 1, wherein the first device transfers the difference file to the second device using at least one coupling, wherein the at least one coupling is at least one of a wireless coupling, a wired coupling, and a hybrid wireless/wired coupling.

7. An apparatus for use in generating a difference files, comprising:
means for receiving an original version and a new version of an electronic file;
means for identifying units of code that are common to the original version and the new versions;
means for identifying instructions that are common to the units of code, wherein the instructions include instruction values that direct processing to another portion of a corresponding file;
means for generating a first instruction value from a first instruction of the original version;
means for generating a second instruction value from a second instruction of the new version, wherein the second instruction corresponds to the first instruction;
means for replacing the first instruction value of the first instruction with the second instruction value;
means for generating a modified version of the original version comprising the first instruction with the second instruction value; and
means for generating the difference file using the new version and the modified version of the original version.

8. A method for reducing a size of a difference file that includes coded differences between an original version and a new version of an electronic file, comprising:

identifying differences between the original version and the new versions corresponding to address shifts resulting from at least one of code line deletion, code line addition, and code line modification;

removing the identified differences in text sections common to the original version and the new versions by modifying target addresses of instructions of the original version using at least one relationship between addresses of text sections of the original version and corresponding text sections of the new version;

generating a modified version of the original version that includes the instructions having modified target addresses; and generating the difference file using the new version and the modified version of the original version.

9. The method of claim 8, wherein removing further includes:

identifying first and second text sections that are common between the original version and the new versions, wherein the first text section in the original version includes a first calculable instruction and the second text section in the new version includes a second calculable instruction;

identifying third and fourth text sections that are common between the original version and the new versions, wherein the third text section in the original version includes a first target address that corresponds to the first calculable instruction, wherein the fourth text section in the new version includes a second target address that corresponds to the second calculable instruction;

generating a second instruction value from the second calculable instruction by modifying the first instruction value using a first difference between starting addresses of the third and fourth function units and using a second difference between starting addresses of the first and second function units; and replacing a first instruction value of the first calculable instruction with the second instruction value.

10. The method of claim 8, further comprising removing the identified differences in instructions including data pointers that point to data sections common to the original version and the new versions by modifying data pointer values in the original version, wherein modifying data pointer values uses a difference between starting addresses of data sections in the original version pointed to by a current data pointer and starting addresses of corresponding data sections in the new version.

11. The method of claim 10, wherein removing identified differences in instructions including data pointers further comprises:

identifying first and second code segments that are common between the original version and the new versions, wherein the first code segment in the original version includes a first data pointer and the second code segment in the new version includes a second data pointer;

identifying first and second data units that are common between the original version and the new versions, wherein the first data unit in the original version includes a first target address that corresponds to the first data pointer, wherein the second data unit in the new version includes a second target address that corresponds to the second data pointer;

generating a second data pointer value from the second data pointer; and replacing a first data pointer value of the first data pointer with the second data pointer value.

12. The method of claim 11, wherein generating the second data pointer value includes modifying a first data pointer value using a difference between starting addresses of the first and second data units.

13. The method of claim 10, further comprising generating a modified version of the original version that includes the instructions having modified data pointers.

14. The method of claim 10, further comprising merging common data units to form common data blocks.

15. The method of claim 14, wherein merging comprises:

combining first and second data units of the original version and combining corresponding first and second data units of the new version to form a common data block when the first data unit of the original version has a size equal to the first data unit of the new version, an ending address of the first data unit of the original version is equal to a starting address of the second data unit of the original version, and an ending address of the first data unit of the new version is equal to a starting address of the second data unit of the new version; and repeating the combining operation for additional mergeable data units.

16. The method of claim 15, further comprising merging common text sections to form common function blocks.

17. The method of claim 16, wherein merging comprises:

combining first and second text sections of the original version and combining corresponding first and second text sections of the new version to form a common function block when the first text section of the original version has a size equal to the first text section of the new version, an ending address of the first text section of the original version is equal to a starting address of the second text section of the original version, and an ending address of the first text section of the new version is equal to a starting address of the second text section of the new version; and repeating the combining operation for additional mergeable text sections.

18. A method for performing file differencing, comprising:

receiving an original version and a new version of an electronic file;

identifying units of code that are common to the original version and the new versions;

identifying instructions that are common to the units of code, wherein the instructions include instruction values that relate to another portion of a corresponding file;

decoding a first instruction value from a first instruction of the original version;

generating a second instruction value from a second instruction of the new version, wherein the second instruction corresponds to the first instruction;

replacing the first instruction value of the first instruction with the second instruction value;

generating a modified version of the original version comprising the first instruction with the second instruction value; and performing file differencing between the new version and the modified version of the original version and generating a difference file.

19. The method of claim 18, further comprising extracting the common units of code from associated map files, wherein the common units of code include common function units and common data units.

20. The method of claim 18, further comprising merging common function units of the units of code to form common function blocks.

21. The method of claim 20, wherein merging comprises:
combining first and second function units of the original version and combining corresponding first and second function units of the new version to form a common function block when the first function unit of the original version has a size equal to the first function unit of the new version, an ending address of the first function unit of the original version is equal to a starting address of the second function unit of the original version, and an ending address of the first function unit of the new version is equal to a starting address of the second function unit of the new version; and
repeating the combining operation for additional mergeable function units.

22. The method of claim 20, further comprising encoding the common function blocks.

23. The method of claim 18, further comprising merging common data units of the units of code to form common data blocks.

24. The method of claim 23, wherein merging comprises:
combining first and second data units of the original version and combining corresponding first and second data units of the new version to form a common data block when the first data unit of the original version has a size equal to the first data unit of the new version, an ending address of the first data unit of the original version is equal to a starting address of the second data unit of the original version, and an ending address of the first data unit of the new version is equal to a starting address of the second data unit of the new version; and
repeating the combining operation for additional mergeable data units.

25. The method of claim 23, further comprising encoding the common data blocks.

26. The method of claim 18, wherein the units of code that are common to the original version and the new versions are common function units, wherein the first instruction includes a first calculable instruction and the second instruction includes a second calculable instruction, wherein generating the second instruction value includes modifying the first instruction value using a first difference between starting addresses of the common function units of the original version and the new versions that include a target address and using a second difference between the starting addresses of the common function units that include the first and second calculable instructions.

27. The method of claim 18, wherein the units of code include function units.

28. The method of claim 27, wherein generating the first instruction value includes generating a difference between a current instruction address of the first calculable instruction and a target address of the first calculable instruction.

29. The method of claim 27, wherein generating the second instruction value includes:
generating a difference between a current instruction address of the first calculable instruction and a target address of the first calculable instruction;
generating a difference between a start address of a first common function unit of the new version and a start address of a corresponding first common function unit of the original version; and
generating a difference between a start address of a second common function unit of the new version and a start address of a corresponding second common function unit of the original version.

30. The method of claim 18, wherein the units of code include data units and the instructions include data pointers.

31. The method of claim 18, wherein the units of code that are common to the original version and the new versions are common data units, wherein the first instruction includes a first data pointer and the second instruction includes a second data pointer, wherein the first instruction value includes a first data pointer value and the second instruction value includes a second data pointer value, wherein generating the second instruction value includes generating a second data pointer value by modifying the first data pointer value using a difference between starting addresses of the first and second data units.

32. The method of claim 18, further comprising:
transferring the difference file to a portable processing system; and
generating a version of the new version in the portable processing system using the difference file.

33. The method of claim 32, further comprising:
merging common function units of the units of code to form common function blocks;
merging common data units of the units of code to form common data blocks; and
encoding the common function blocks and the common data blocks for use in generating the version of the new version in the portable processing system.

34. A method for determining differences between electronic files, comprising:
receiving an original version and a new version of an electronic file;
identifying first and second function units that are common between the original version and the new version, wherein the first function unit in the original version includes a first calculable instruction and the second function unit in the new version includes a second calculable instruction;
identifying third and fourth function units that are common between the original version and the new version, wherein the third function unit in the original version includes a first target address that corresponds to the first calculable instruction, wherein the fourth function unit in the new version includes a second target address that corresponds to the second calculable instruction;
generating a second instruction value from the second calculable instruction;
replacing a first instruction value of the first calculable instruction with the second instruction value;
generating a modified version of the original version comprising the first instruction with the second instruction value; and
generating a difference file using the new version and the modified version of the original version, the difference file including the differences.

35. The method of claim 34, wherein generating the second instruction value includes modifying the first instruction value using a first difference between starting addresses of the third and fourth function units and using a second difference between starting addresses of the first and second function units.

36. The method of claim 34, further comprising:
identifying first and second code segments that are common between the original version and the new version, wherein the first code segment in the original version includes a first data pointer and the second code segment in the new version includes a second data pointer;

identifying first and second data units that are common between the original version and the new versions, wherein the first data unit in the original version includes a first target address that corresponds, to the first data pointer, wherein the second data unit in the new version includes a second target address that corresponds to the second data pointer;

generating a second data pointer value from the second data pointer;

replacing a first data pointer value of the first data pointer with the second data pointer value; and generating a modified version of the original version comprising the first data pointer with the second data pointer value.

37. The method of claim 36, wherein generating the second data pointer value includes generating a difference between starting addresses of data sections in the original version pointed to by a current data pointer and starting addresses of corresponding data sections in the new version.

38. The method of claim 34, further comprising merging common function units to form common function blocks.

39. The method of claim 34, further comprising merging common data units to form common data blocks.

40. The method of claim 34, further comprising:

transferring the difference file to a portable processing system; and generating a version of the new version in the portable processing system using the difference file.

41. A computer readable medium including executable instructions which, when executed in a processing system, reduce a size of a difference file that includes coded differences between an original version and a new version of an electronic file by:

identifying differences between the original version and the new version corresponding to address shifts resulting front at least one of code line deletion, code line addition, and code line modification;

removing the identified differences in text sections common to the original version and the new versions by modifying target addresses of instructions of the original version using at least one relationship between addresses of text sections of the original version and corresponding text sections of the new version;

generating a modified version of the original version that includes the instructions having modified target addresses; and generating the difference file using the new version and the modified version of the original version.

* * * * *